United States Patent [19]

Kamo et al.

[11] Patent Number: 4,738,227
[45] Date of Patent: Apr. 19, 1988

[54] THERMAL IGNITION COMBUSTION SYSTEM

[75] Inventors: Roy Kamo; Ramesh M. Kakwani; Edgars Valdmanis; Melvins E. Woods, all of Columbus, Ind.

[73] Assignee: Adiabatics, Inc., Columbus, Ind.

[21] Appl. No.: 907,809

[22] Filed: Sep. 16, 1986

Related U.S. Application Data

[63] Continuation-in-part of Ser. No. 831,639, Feb. 21, 1986, abandoned.

[51] Int. Cl.⁴ ..................... F02B 19/00; F02B 45/02
[52] U.S. Cl. ...................................... 123/23; 123/254; 123/270; 123/668
[58] Field of Search ............... 123/254, 255, 270, 271, 123/143 R, 143 A, 23, 143 B, 668

[56] References Cited

U.S. PATENT DOCUMENTS

| | | |
|---|---|---|
| 1,762,550 | 6/1930 | French .................................. 123/271 |
| 1,798,260 | 3/1931 | Hehr ..................................... 123/270 |
| 2,739,578 | 3/1956 | Stump . |
| 2,855,908 | 10/1958 | Pflaum ............................. 123/254 X |
| 3,082,752 | 3/1963 | Thomas ............................... 123/668 |
| 3,110,292 | 11/1963 | Dobrosavljevic ................... 123/254 |
| 3,140,697 | 7/1964 | Peras . |
| 3,259,116 | 7/1966 | Bricout . |
| 3,398,726 | 8/1968 | Bricout ............................... 123/254 |
| 3,408,995 | 11/1968 | Johnson ............................... 123/668 |
| 3,965,870 | 6/1976 | Clark ...................................... 123/23 |
| 4,074,671 | 2/1978 | Pennila ................................. 123/668 |
| 4,284,055 | 8/1981 | Wakeman ....................... 123/254 X |
| 4,300,497 | 11/1981 | Webber ............................... 123/254 |
| 4,398,527 | 8/1983 | Rynbrandt .......................... 123/668 |
| 4,426,966 | 1/1984 | Huther et al. ................... 123/270 X |
| 4,485,778 | 12/1984 | Oliver ................................ 123/254 |
| 4,511,612 | 4/1985 | Huther et al. ................... 123/270 X |
| 4,522,171 | 6/1985 | Dworak et al. ................. 123/254 X |
| 4,558,664 | 12/1985 | Robben ................................. 123/23 |

Primary Examiner—Tony M. Argenbright
Attorney, Agent, or Firm—Woodard, Emhardt, Naughton Moriarty & McNett

[57] ABSTRACT

The thermal ignition combustion system comprises means for providing walls defining an ignition chamber, the walls being made of a material having a thermal conductivity greater than 20 W/m° C. and a specific heat greater than 480 J/kg° C. with the ignition chamber being in constant communication with the main combustion chamber, means for maintaining the temperature of the walls above a threshold temperature capable of causing ignition of a fuel, and means for conducting fuel to the ignition chamber.

31 Claims, 5 Drawing Sheets

THERMAL IGNITION COMBUSTION SYSTEM

RECOGNITION OF GOVERNMENT SUPPORT

This invention was made with Federally Funded Research Government support under Contract No. DE-AC21-84MC21099 awarded by The Department of Energy. The government has certain rights in this invention.

CROSS-REFERENCE TO RELATED APPLICATION

This is a continuation-in-part of the prior application Ser. No. 831,639, filed Feb. 21, 1986 of Roy Kamo, now abandoned.

FIELD OF THE INVENTION

This invention relates to an ignition system, and more particularly to a thermally ignited combustion system adaptable to an internal combustion engine capable of operating on a wide variety of fuels including coal, natural gas, diesel and other synthetic fuels.

BACKGROUND OF THE INVENTION

The idea of an engine operating on solid fuel, such as a coal fueled diesel engine, was examined as far back as 1900 by Rudolph Diesel. The handling of solid fuels and problems of ash deposition, however, discouraged Diesel from further pursuit of the idea. Between the early 1900's and the end of World War II, thousands of hours of intense research and development were spent trying to develop a practical solid fuel-burning engine. Several of such systems were produced such as one capable of burning coal-water slurry fuels as disclosed in U.S. Pat. No. 4,558,664 issued to Robben or one capable of burning solvent refined coal as disclosed in U.S. Pat. No. 3,965,870 issued to Clark. None of the systems developed however have yet satisfactorily solved the inherent problems associated with solid fuel burning such as fuel handling, ash deposition, high particulate content in emissions, low thermal efficiency, high wear and higher costs associated with the production of special fuels.

Much technological research has also been spent in the development of the natural gas engine. The earliest gas engines were carburetted and spark ignited. Then the short lived "dual fuel engine" was developed whereby a lean mixture of natural gas was ignited by a diesel pilot. However, the expensive diesel pilot injection and the need for carrying two different fuels were soon replaced by a spark plug. Today, most of the natural gas engines are still carburetted and spark ignited with low inherent cycle efficiency and a short-lived spark plug. Only recently, high pressure gas injection into a high compression ratio engine has come under investigation. Such engines are either spark-ignited or diesel pilot-ignited during the high pressure gas injection period.

One aspect of this invention involves ignition of an air-fuel mixture through rapid heat transfer at a high temperature to the air-fuel mixture from a specially designed heat storage unit. Heretofore, insulation of various sections of the engine or use of materials having low thermal conductivity have been suggested and tried in order to enhance the performance and efficiency of the spark-ignited or diesel engine. A variety of such applications are disclosed in the following U.S. Pats. Nos.:

| | |
|---|---|
| 4,300,497 | Webber |
| 4,511,612 | Huther |
| 3,110,292 | Dobrosavljevic |
| 3,140,697 | Peras |
| 4,522,171 | Dworak, et al. |
| 2,739,578 | Stump |
| 3,259,116 | Bricout |
| 1,798,260 | Hehr |
| 4,558,664 | Robben |
| 4,485,778 | Oliver |

Although increased performance in some of the important engine output parameters was realized, data in others was still unsatisfactory, such as a high particle content (soot) due to inefficient or incomplete fuel burning and the need for high compression ratios. Likewise, innovations in either solid fule-burning engines or natural gas engines have still not produced a fuel burning system which meets the desired goals such as high thermal efficiency and low pollution content.

SUMMARY OF THE INVENTION

This invention provides a novel system for operating power systems such as the internal combustion engine and utilizes a thermal ignition process which is not dependant on the production of threshold temperatures obtained through high compression of gasses to ignite the air-fuel mixture. The present invention utilizes prechamber or ignition chamber walls designed to store rather than dissipate thermal energy. The heat energy produced during combustion is stored in the specially designed walls of the ignition chamber and is then transferred directly to the next cycle air-fuel mixture causing spontaneous combustion. The result is the production of a high temperature thermal environment which promotes a higher fuel energy heat release rate than in conventional engines. This in turn results in more complete burning of the air-fuel mixture taking place in a shorter crank angle duration and producing a higher thermal and mechanical efficiency.

One embodiment of the present invention includes a thermal ignition combustion system adapted for use with an internal combustion engine, the engine having a main combustion chamber. The thermal ignition combustion system comprises means for providing walls defining an ignition chamber, the walls being made of a material having a thermal conductivity greater than 20 W/m°C. and a specific heat greater than 480 J/kg°C. with the ignition chamber being in constant communication with the main combustion chamber, means for maintaining the temperature of the walls above a threshold temperature capable of causing ignition of a fuel, and means for conducting fuel to the ignition chamber.

It is an object of the present invention to provide an improved ignition system for internal combustion engines.

It is another object of the present invention to provide a fuel burning system which increases the thermal efficiency of the engine cycle.

It is another object of the present invention to provide a fuel burning system which will operate not only on gasoline, but also on fuels such as coal, coal slurry, natural gas or diesel.

Related objects and advantages of the present invention will become apparent from the following disclosure.

DESCRIPTION OF THE PREFERRED EMBODIMENT

Figure 1:
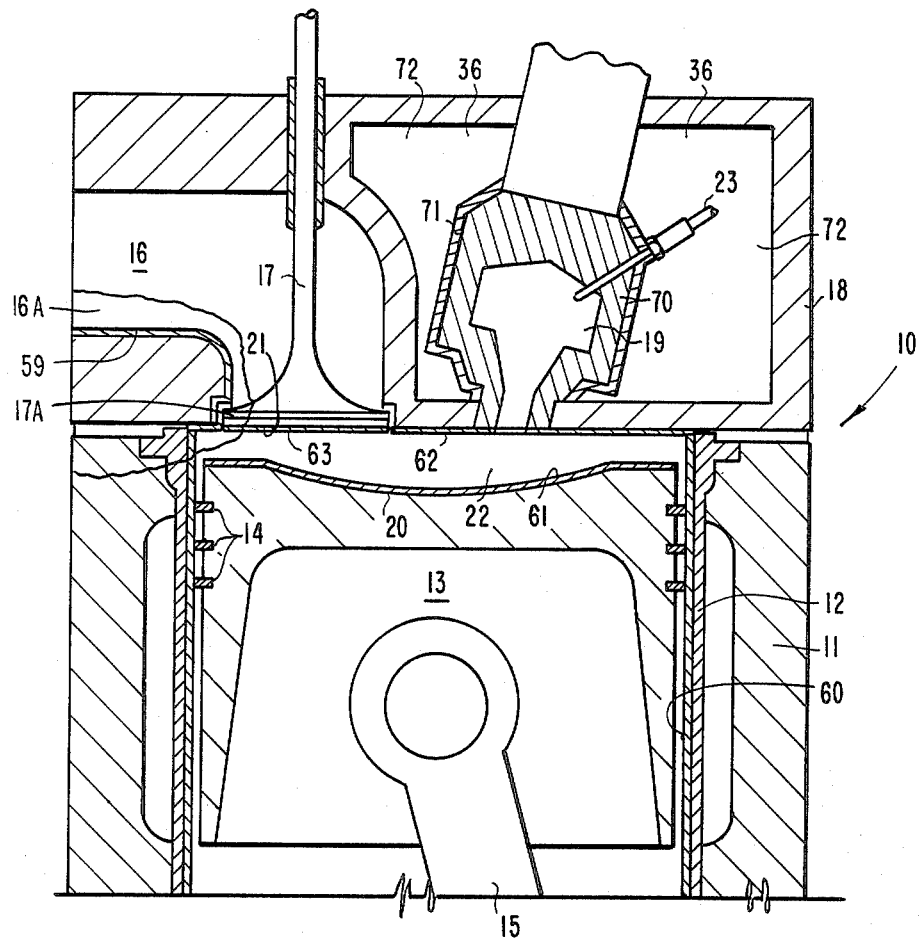
FIG. 1 is a side elevational view, partly in cross-section, of the thermal ignition system adapted to a single cylinder engine to burn coal in accordance with one embodiment of the present invention. A portion of FIG. 1 is broken out to show the exhaust port.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, there is shown a thermal ignition combustion system integrally connected to a modified single cylinder engine in accordance with one embodiment of the present invention. The engine adapted for this embodiment is the known 1Y73 Caterpillar having a 130.2 mm (5.125 inch) bore, 165.1 mm (6.5 inch) stroke, 2.2 liter (134.1 cubic inch) displacement and a compression ratio of 16.5 to 1. The unmodified engine is capable of operating in the range of 800 rpm to 1800 rpm and has a pre-chamber combustion chamber. The 1Y73 was adapted, as described herein, to operate on coal powder. More specifically, the fuel to be used in this embodiment is micronized Otisca coal commercially available from OTISCA Industries, Ltd. of Syracuse, N.Y. The coal used was bituminus coal wherein 95.7% by weight had a particle size less than 20 microns (average size approximately 5 microns), 0.8% ash content, 33,885 kJ/kg colorific value, and 0.9% sulfur content.

Figure 3:
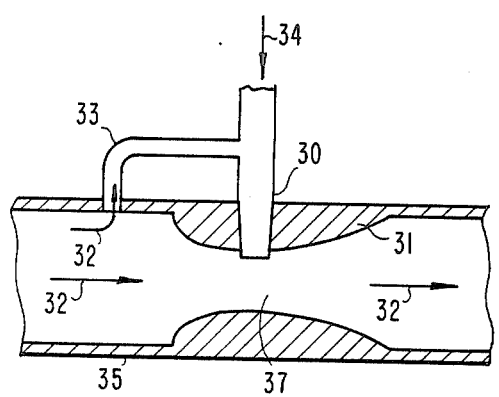
FIG. 3 is a side cross-sectional view of the coal delivery nozzle taken along section lines 3—3 of FIG. 2.

As shown in FIG. 1, the single cylinder engine 10 includes an engine block 11, cylinder walls defined by a cylinder liner 12, a piston 13 with step gap piston rings 14 and a piston rod 15, an intake port 16 with intake poppet valve 17, an exhaust port with an exhaust poppet valve 17A, a cylinder head 18 and a pre-chamber combustion chamber or ignition chamber 19. A main combustion chamber 22 of the unmodified engine is defined by the piston crown 20 of piston 13, cylinder head 18, cylinder liner 12 and the faces 21 of the poppet valves. The configuration of the exhaust port 16A and poppet valve 17A is identical to that of the intake port 16 and poppet valve 17 except for a zirconia lining within the exhaust port as will be explained herein. The zirconia lining 59 is not present in the commercial 1Y73 Caterpillar engine. The micronized coal is fumigated in the intake manifold 35 through coal delivery nozzle 30 which was added to the engine. (FIG. 3) The delivery nozzle is positioned to deliver the coal powder at the stricture 37 of a venturi nozzle 31, also added to the engine and located within the intake manifold 35 which leads to intake port 16. Arrows 32 indicate the direction of air flow within the intake manifold. Air passage 33 provides air to mix upstream with the incoming coal powder (shown by arrow 34) aiding to form a suspension of coal powder in air into the venturi nozzle.

Figure 2:
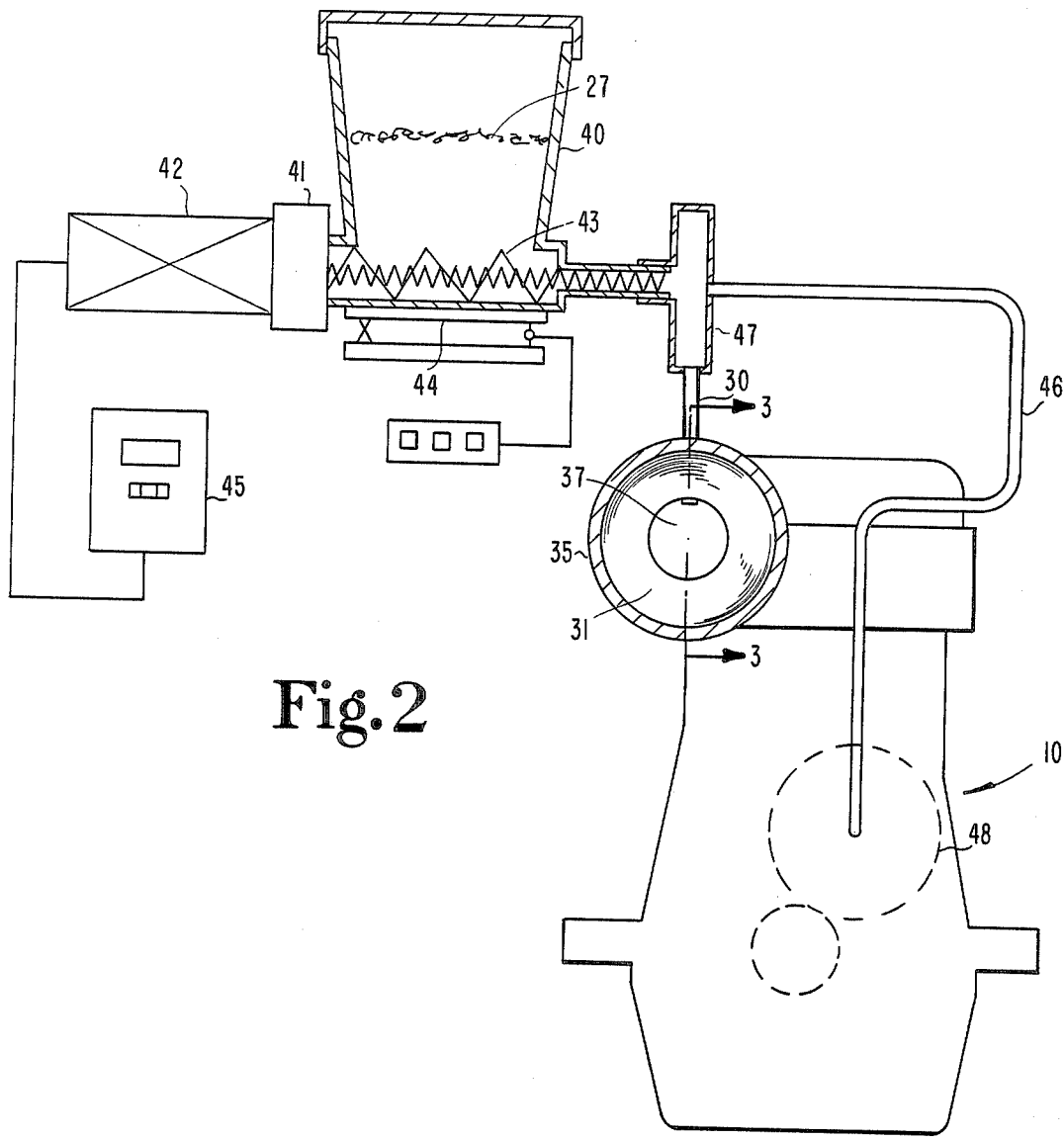
FIG. 2 is a diagrammatic view, partially in cross-section, of the coal delivery system.

The coal feed system, adapted for this embodiment, was constructed from commercially available elements and is shown in FIG. 2. It includes the following commercially available elements: a volumetric feeder 40, an intromitter drive 41, a variable speed DC motor 42, a screw conveyer 43, a scale with digital readout 44, a variable speed controller 45 and a flexible driveshaft 46. The variable speed DC motor 42 and intromitter drive 41, which are controlled by the variable speed controller 45, drive the screw conveyer 43. The coal powder 27 contained in the volumetric feeder 40 is directed to the injection nozzle 30 by the screw conveyer 43. For optimal operation of the system described in this embodiment, the particle size of the coal fuel should be no greater than 20 microns. Also, the coal powder should be kept free of agglomerates as it is delivered to and fumigated into the intake manifold 35. When the humidity increases, coal powder often has a tendency to clump, forming agglomerates which may fail to break apart upon fumigation. This may result in miniature, uncontrolled and uneven explosions within the ignition chamber 19 and main combustion chamber 22. A suitable means for keeping the agglomerates to a minimum, or even eliminating the agglomerates as the coal is fumigated into the intake manifold 35, may be desired. One approach to improve this condition is to insert a fluidizing means 47 between the screw conveyer 43 and the delivery nozzle 30. The fluidizing means should break apart the agglomerates, possibly by some type of rotary/kinetic or grinding motion.

Figure 6:
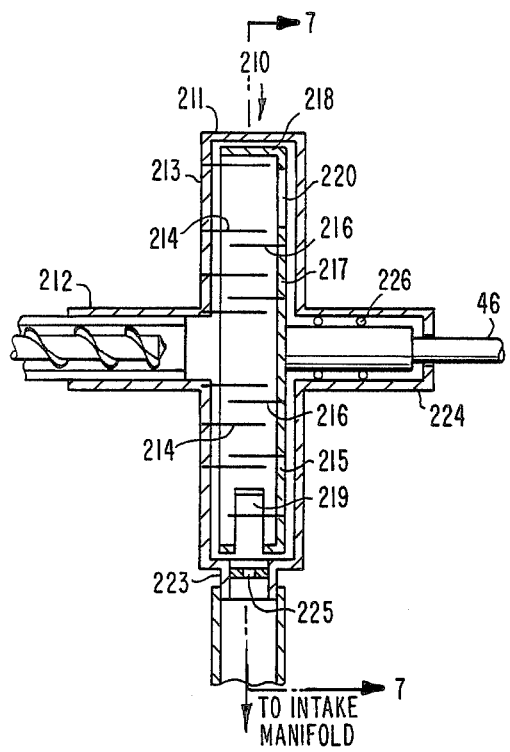
FIG. 6 is a side view, partially in cross-section, of the fluidizer, showing only those pins in the plane of the cross-section.
Figure 7:
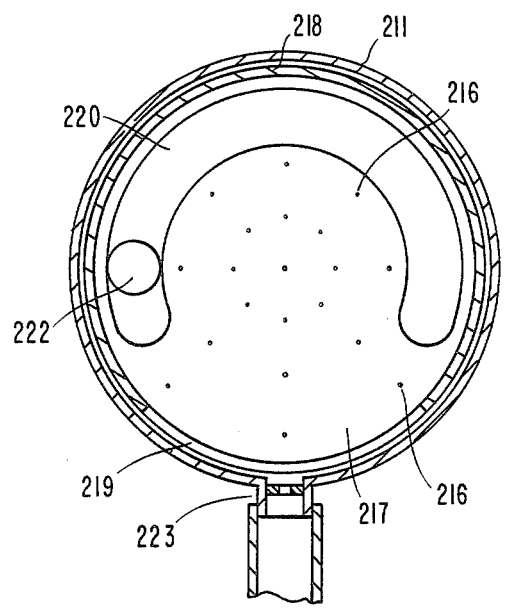
FIG. 7 is a cross-sectional view of the fluidizer along the lines 7—7 of FIG. 6, and showing only those pins connected to the rotor.
Figure 8:
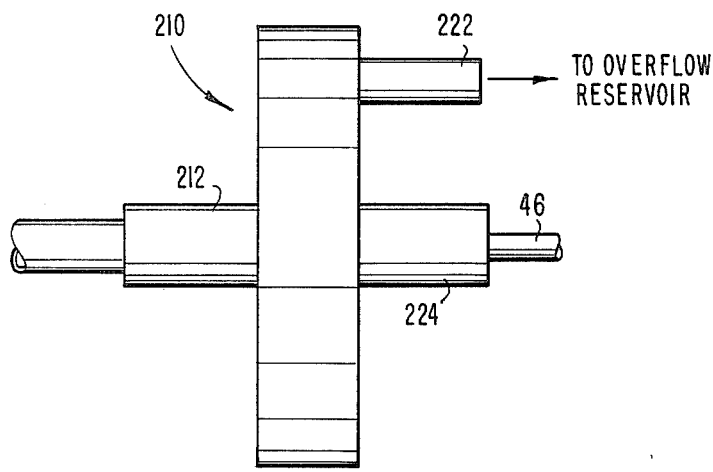
FIG. 8 is a top plan view of the fluidizer.

In the present embodiment, a fluidizing means or fluidizer 210 (FIGS. 6, 7 and 8) was constructed to promote coal powder consistency free of agglomerates. Coal powder is fed from the feeder 40 directly into a cylindrically shaped body 211 of the fluidizer 210 through an entrance port 212 in the end plate 213. The body additionally has an overflow port 222, an outlet port 223 and drive shaft port 224. End plate 213 has several rows of fixed, radially arranged and substantially orthogonal pins 214. Concentrically contained within the body 211 is a cylindrical rotor 215 which also incorporated rows of radially arranged pins 216. The pins 216, fixed to the rotor, extend toward end plate 213 so as to overlap pins 214, but pins 216 are radially staggered relative to the pins 214 so that rotor 215 may be rotated within the body 211 without pins 214 coming in contact with pins 216. A flexible shaft 46 is connected between the engine camshaft 48 and the rotor 215, with O-rings 226, or some suitable sealing means, preventing the coal powder from exiting the driveshaft port 224. The rotor is drum shaped having an open end toward which pins 214 extend, a bottom end 217 and cylindrical side walls 218. The side walls 218 have a radial port 219 for passage of the coal powder through an orifice 225 in the outlet port 223 and to the intake manifold. The bottom 217 has an axial port 220 for passage of the coal powder to the overflow port 222.

After entering the fluidizer body 211, the coal powder is set into rotating motion by the rotor 215 and pins 216 which are driven by the shaft 46. The relative motion of the two sets of pins, 214 and 216, generates intensive kinetic agitation of the powder improving its flowability while also repulverizing any crumbs or agglomerates which may have formed. For a given set of values representing the screw conveyer feed rate, rotor rpm, total mass accumulated inside the rotor, size of the orifice, and static pressure difference between inside and outside the rotor, and values related to coal rheology, the flow rate of the coal powder into the fluidizer may start to exceed the flow rate out causing a back-up or excess in the fluidizer. Axial port 220 allows for this excess coal to pass out of the rotor, through the overflow port 222 and to a reservoir (not shown) assuring a steady state, uninhibited flow. Using the scale with digital readout 44 to provide a metered amount of coal to the fluidizer, measuring the overflow mass and adjusting the other above-mentioned parameters can allow the coal powder flow rate to the intake manifold 35 to be precisely controlled.

One concept underlying this invention is ignition of an air-fuel mixture through rapid heat transfer at a high temperature to the air-fuel mixture from a specially designed heat storage unit. Unlike prior designs which require high compression rates to provide diesel-type ignition, or use insulation of parts of the engine to vaporize the fuel or to aid in the diesel process, the present invention relies entirely on high temperature heat storage and subsequent rapid heat transfer from the heat storage unit to the air-fuel mixture to achieve ignition. Thus, the Caterpillar 1Y73 is modified as follows. The heat storage is achieved first by insulating primary combustion surfaces of the engine and by removing the cooling liquid from the passages 36 of the cooling system so as to leave air therein thereby creating a nearly adiabatic system. The cylinder liner 12 is cast iron and its interior surface is coated with a 1.0 mm thickness of plasma sprayed zirconia ($ZrO_2$) 60 for insulation. The zirconia has a thermal conductivity of 2 W/(m·°C.). A suitable ceramic coating is then applied over the zirconia 60 to improve the wear of the zirconia. In the present embodiment, a K'Ramic coating was used. K'Ramic is a trademark for a ceramic coating which is performed by Kaman Sciences Corp., 4765 Northpart Drive, Colorado Springs, Colo. 80907. Specifically, the K'Ramic coating contains silica, chromia, and alumina which is densified by chromic acid treatments. The chrome is applied in liquid form made up of hexavalent chromium and water in a variety of ways—spraying, painting or immersion. Capillary action pulls the chrome liquid into the open pores, thereby filling the pores with the liquid chrome. The coating is then fired at about 1000° F. which drives off the water and converts the hexavalent chrome into $Cr_2O_3$ (chrome oxide) at the same time generating an oxide bond. In order to seal off the pores with chrome oxide, a number of impregnation cycles are needed. The number of cycles varies from 5 to 15 and the final thickness is about 0.127 mm. The process is more fully described in U.S. Pat. No. 3,956,531 which is hereby incorporated by reference.

The zirconia coating may be composed of partially or fully stabilized zirconia and may be performed commercially by APS Materials, Inc., 153 Wildbrook, Dayton, Ohio 45405. Due to the increased operating temperatures and the burning and ash characteristics of coal powder, the rings also receive a K'Ramic coating to reduce wear. The piston is made of aluminum and the piston crown 20 is coated with a 1.2 mm thickness of plasma sprayed zirconia ($ZrO_2$) 61. The crown 20 and zirconia coating 61 are then coating with a wear resistant coating. Since the 1000° F. temperature of the K'Ramic process would melt the aluminum piston, an alternative coating called Zircon is used. Zircon is also a trademark and can be obtained commercially from Kaman Sciences Corp., 4765 Northpart Drive, Colorado Springs, Colo. 80907. Any of a host of other commercially available ceramic coatings will substitute for the Zircon including the previously described K'Ramic coating which will perform well in place of the Zircon sealer in each application described herein except for the aluminum piston. The cylinder head 18 is cast iron and the portion of it which is exposed to the main combustion chamber 22 is coated with a 1.40 mm thickness of plasma sprayed zirconia ($ZrO_2$) 62 and also with a Zircon sealer. The lining of the exhaust port 16A is also coated with a 1.0 mm thickness of plasma sprayed zirconia ($ZrO_2$) and also with a Zircon sealer. The intake port 16 is not insulated as it is generally not an important source of heat loss and because the intake gases should be at a low temperature for better volumetric efficiency. The faces of both the intake and exhaust poppet valves 21 are likewise coated with a 1.0 mm thickness of plasma sprayed zirconia ($ZrO_2$) 63 with a Zircon sealer. The combined insulation effect reduces the heat transfer out of the main combustion chamber resulting in a more adiabatic system.

The coating of the various combustion chamber parts and related surfaces of this embodiment are summarized below for convenience.

| Part | Coating |
| --- | --- |
| Cylinder Liners | 1.0 mm thickness plasma sprayed zirconia which is then covered with a K'Ramic coating. |
| Piston Rings | Covered with K'Ramic coating. |
| Cylinder Head | 1.4 mm thickness plasma sprayed zirconia covered with a Zircon sealer. |
| Piston Crown | 1.2 mm thickness plasma sprayed zirconia covered with a Zircon sealer. |
| Exhaust Port | 1.0 mm thickness plasma sprayed zirconia covered with a Zircon sealer. |
| Valve Faces | 1.0 mm thickness plasma sprayed zirconia covered with a Zircon sealer. |

The balance of the heat storage effect is achieved by the design of the pre-chamber or ignition chamber 19. The ignition chamber walls 70, which define the ignition chamber, are composed of a material having a high specific heat, a high thermal conductivity and the ability to withstand the high temperatures associated with this invention. In addition, the mass and material composition of the chamber walls 70 have a heat capacity of at least 22 J/°C. per liter displacement. This parameter is thus made to depend on the size of the engine since, as the engine displacement increases, the need for greater heat storage in the ignition chamber walls increases. In the present embodiment, the ignition chamber walls 70, which define the entire interior surface of the ignition chamber, are composed of cast iron. It is the belief of the inventor that siliconnitride ($Si_3N_4$), which has a thermal conductivity of 25 W/(m·k) at 400K and a specific heat of 710 J/(kg°C.), would perform better. Heat capacity in J/°C. is the product of specific heat, expressed as J/(kg°C.), and mass in kg. The 1Y73 Caterpillar has a displacement of 2.2 liters. Thus, to achieve a heat capacity of 22 J/°C. per liter of displacement, the mass of the silicon nitride walls must be greater than 70 g. The walls 70 are then provided with an insulating barrier to retain the stored heat within the ignition chamber walls. The barrier comprises a layer of a suitable insulating material such as a coating 71 of zirconia approximately 2.0 mm in thickness. The zirconia layer is applied to the exterior surface of the walls and surrounds greater than 85% of the walls. Further insulation of the ignition chamber is provided by an air pocket 72 surrounding the zirconia coating 71 of the ignition chamber walls 70, which in the present embodiment, is formed merely by removing the liquid from the cooling system passages 36. The thickness of the air pocket, that is the radial distance between the zirconia coating 71 and the nearest point of material of the cylinder head 18, varies due to the non-uniform configuration of the cylinder head 18. However, the minimum thickness of the air pocket is approximately 2 mm.

The resulting system reduces the heat flow out of the engine by as much as 40% and has a capacity to store a large quantity of heat within the the silicon nitride walls 70. Thus, during normal engine operation, due to the high heat capacity of the walls 70 and due to the insulation effects of the ignition and main combustion chambers, the temperature of the walls 70 of the ignition chamber will reach a minimum of 1000° F. and typically, during average to peak loads, this temperature will be between 1400° F. and 2000° F. When the load on the engine is low, the operating temperature of the ignition chamber walls may fall as low as 1000° F. The coal fuel will operate efficiently within the entire range of this system. In fact, the engine will run well on the coal powder at about 800° F. While the ignition chamber walls are in the higher temperature range, however, producing a much higher thermal operating environment for the ignition process, the heat release of the coal explosion occurs during a much shorter crank angle than in a conventional engine. Additionally, the higher temperature thermal environment causes a much more complete and efficient burning of the coal fuel. To aid in starting the engine, a glow plug 23 is provided within the ignition chamber. The use of the glow plug 23 is continued until the ignition chamber walls reach somewhere between the threshold ignition temperature of the coal powder (about 700° F.) and about 800° F. where the coal begins to burn efficiently.

The operation of the engine of the present embodiment with the thermal ignition system, as shown in FIG. 1, occurs as follows. During the intake stroke, poppet valve 17 opens and piston 13, driven by piston rod 15 and a camshaft (not shown), draws in the air-fuel mixture (as described above) through the intake port 16. During the compression stroke, poppet valve 17 closes and piston 13 moves upward and compresses the air-fuel mixture within the main combustion chamber 22 and the ignition chamber 19. In a conventional engine, there is a tendency for the initial compressed gas temperatures to rise due to the mechanical compression work, then quickly fall due to heat transfer to the water cooled walls. In a diesel engine, the air temperature will also rise upon compression, but then fall somewhat due to heat transfer before the fuel is injected. In the present embodiment, the compressed fuel and gas mixture temperatures will rise due to mechanical compression work, but then continue to rise due to the heat transfer from the walls 70 of the ignition chamber. This additional heat transfer creates a high temperature thermal environment which pushes the air-fuel mixture temperature well past the ignition temperature of the coal powder causing spontaneous combustion. For the powdered coal used in this embodiment, the ignition temperature is approximately 700° F.

Explosion of the air-fuel mixture then forces piston 11 downward during the power stroke. The high temperature thermal environment created in the ignition chamber causes a much higher heat release rate of the fuel during the power stroke leading to an increase in mechanical work output and engine efficiency. The higher temperature thermal environment and higher heat release rate also results in a more complete burning of fuel resulting in more efficient fuel consumption and a decrease in levels of carbon monoxide, hydrocarbons, smoke, and particulate emissions. The insulation of the main combustion chamber surfaces 60, 61, 62 and 63 prevents the majority of heat from escaping through the engine block, piston, valves or cylinder liner. Due to the high heat capacity and thermal conductivity of the ignition chamber walls 70, the extreme heat created during the combustion is partially transferred to the ignition chamber walls for storage until the intake stroke of the next cycle. The remainder of the generated and unused heat is lost to the environment during the exhaust stroke as the exhaust poppet valve 17A opens and the piston 13 moves upward forcing the exhaust gases out exhaust port 16A.

The high temperature thermal environment attainable in this invention enables the burning of other fuels heretofore not considered practical due to their low efficiencies at conventional, non-adiabatic engine operating temperatures or to the complicated systems which are required to effect their combustion. One such fuel, natural gas, is the fuel used in the following alternative embodiment.

Figure 4:
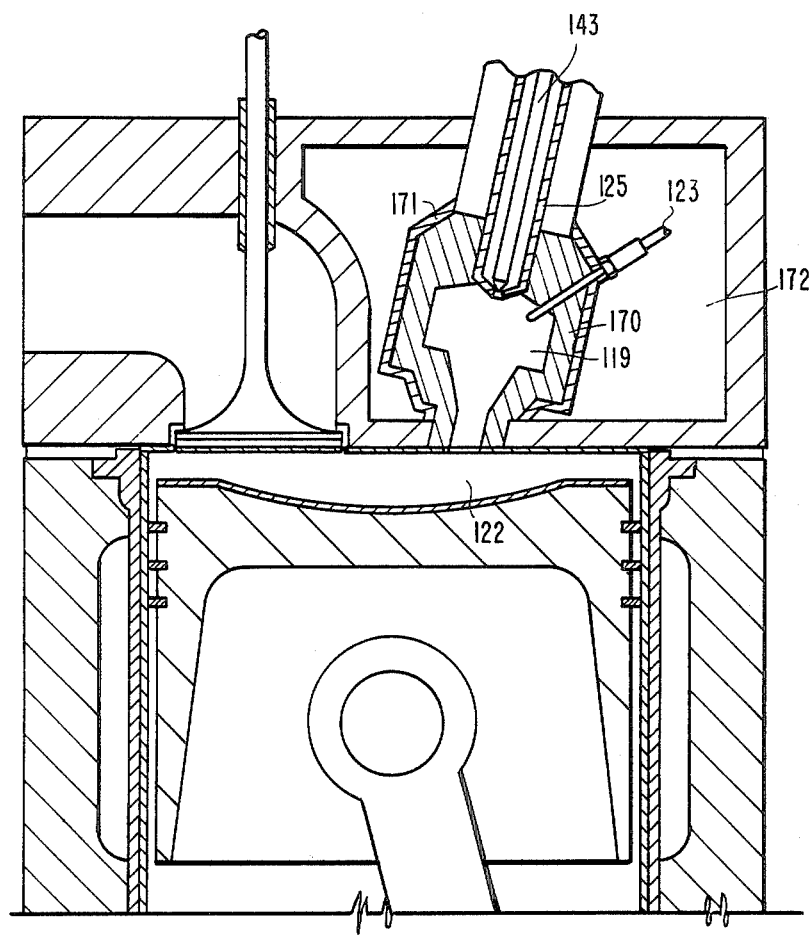
FIG. 4 is a side elevational view, partly in section, of the thermal ignition system adapted to a single cylinder engine to burn natural gas in accordance with another embodiment of the present invention.
Figure 5:
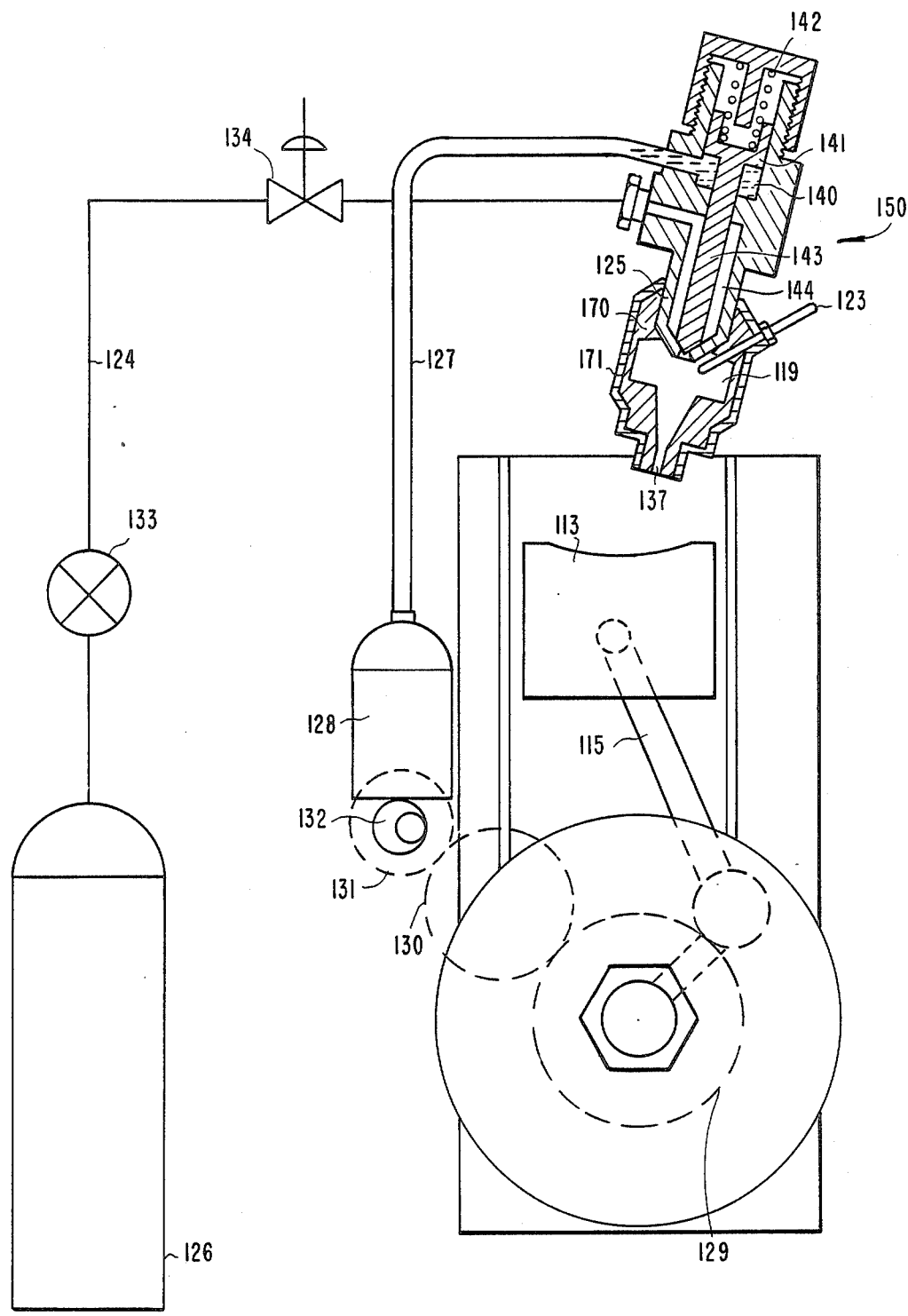
FIG. 5 is a diagrammatic view of the natural gas delivery system.

An embodiment of the thermal ignition combustion system for natural gas is illustrated in FIG. 4. The above-mentioned 1Y73 Caterpillar engine is again used to construct the embodiment. This embodiment is nearly identical to the previous embodiment, having a main combustion chamber 122, an ignition chamber 119, ignition chamber walls 170, a zirconia coating 171 surrounding the walls 170 and an air pocket 172. The variations involve the fuel used and the manner and timing of the fuel introduction. As shown in FIGS. 4 and 5, the ignition chamber 119 is defined by the ignition chamber walls 170. A suitable means for injecting the natural gas into the ignition chamber is provided and designated at 150. A standard, commercially available diesel injector may be used and easily adapted to inject natural gas at a pressure of between 3000 and 5000 psi. As shown in FIG. 5, the fuel is admitted to the ignition chamber 119 through a fuel injector admission line 124. Injection of high pressure natural gas into the ignition chamber is achieved by actuating the opening of the injector nozzle 125 which is connected to the high pressure natural gas source 126. The source 126 may be either stored under pressure or compressed during operation. The timing of the opening and closing of the injector nozzle 125 is controlled by the hydraulic control line 127 which is supplied from a pump 128 actuated by the engine cam shaft through gearing 129, 130, 131 and 132. An increase in hydraulic pressure through line 127 into reservoir 140 forces piston 141 in the direction of and against biasing spring 142 which pulls up injection nozzle valve 143 allowing fuel to flow through passage 144 and to enter ignition chamber 119. High pressure fuel (natural gas) is delivered through a control valve 133 and through emergency shut-off valve 134. The high pressure natural gas is injected in a diverse spray into the combustion chamber 119 to create even and rapid mixing of the fuel with the compressing air. The injection occurs during the crank angle duration of approximately 10° before top dead center to 10° after top dead center.

Again to aid in starting a cold engine and until the ignition chamber walls 170 reach a temperature where the natural gas is burning efficiently, a glow plug 123 is provided in the ignition chamber. The natural gas used is approximately 90% methane and has a threshold combustion temperature of aproximately 1350° F. During normal engine operation, due to the high heat capacity of the walls 170 and to the insulation effects on the ignition and main combustion chambers 122 and 119, respectively, the temperature of the walls 170 of the ignition chamber will be between 1400° F. and 2000° F. As in the first embodiment, the result is a very efficient and complete burning of the natural gas with lower emission characteristics.

Alternative embodiments may be produced by varying certain parameters. For example, varying the relative thicknesses of the zirconia layer 71 and of the air pocket 72 surrounding the ignition chamber walls 70 may be performed to tune the thermal ignition combustion system to operate at or within a certain desired temperature range. Thus, if the cylinder head configuration will permit up to approximately a 12 mm thickness in the air pocket 72, then no zirconia layer 71 may be required to achieve an ignition chamber wall operating temperature for coal of 1200° F. or above. Conversely, where only a small air pocket is possible, a 3 mm thickness of zirconia coating 71 may be sufficient to achieve the desired ignition chamber wall operating temperature. This flexibility will also permit the engine's cooling system to be operated in its intended manner if desired. Thus, the coolant may be left in and the zirconia and/or an air pocket having an adequate thickness may be provided to achieve the same results.

The system may also likewise be tuned to burn a variety of other fuels. For example, diesel fuel, which has an ignition temperature of about 500° F., may be burned more efficiently with lower emission characteristics. The operating temperatures of this system also will permit burning of synthetic diesel and gasoline fuels, coal derived liquid fuels, methanol or ethanol. Aside from discretionary tuning of the ignition chamber to operate within certain temperatures, the only other modification which is needed to construct a thermal ignition combustion system capable of burning another liquid or solid fuel is to design the injector means to operate with the particular fuel to be used. This task is with the knowledge of persons skilled in this art.

Another variation which may improve the performance of the coal burning embodiment is to design the fluidizing means, or some other means designed to operate in conjunction with the fluidizer, to feed the coal powder to the intake manifold only during the period in which the intake valve is open. This will allow the coal powder fuel to be metered into the intake air at a predetermined timing during the engine operating cycle, thus improving the efficiency of the engine.

Another variation is to feed the coal powder in a timed fashion directly into the ignition chamber.

The material composing the walls of ignition chamber may be any of various materials which meet the requirements cited previously of high thermal conductivity, high specific heat and mass (high heat capacity) and the ability to withstand the high temperatures associated with this invention. One such material that would meet these requirements, other than silicon nitride, is another ceramic material—silicon carbide (SiC) (which has a thermal conductivity of 87 W/(m·K) and a specific heat of 669 J/(kg·°C.).

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A thermal ignition combustion system adapted for use with an internal combustion engine, said engine having a main combustion chamber, said thermal ignition combustion system comprising:
   (a) means for providing ignition chamber walls defining an ignition chamber, said chamber walls being made of a material having a thermal conductivity greater than 20 W/m°C. and a specific heat greater than 480 J/kg° C., said ignition chamber being in constant communication with said main combustion chamber;
   (b) means for maintaining the temperature of said chamber walls above a threshold temperature capable of causing ignition of a fuel; and
   (c) means for conducting fuel to said ignition chamber.

2. The thermal ignition combustion system of claim 1, wherein the heat capacity of said chamber walls is greater than 22 J/°C. per liter displacement.

3. The thermal ignition combustion system of claim 2, wherein said means for maintaining the temperature of said chamber walls includes insulation of said chamber walls, said insulation of said chamber walls being located externally of said chamber walls and of said ignition chamber, and wherein said insulation of said chamber walls surrounds more than 85% of said chamber walls and said ignition chamber.

4. The thermal ignition combustion system of claim 3, wherein said main combustion chamber is defined by a piston, cylinder walls, a cylinder head and a plurality of valves, and wherein said means for maintaining the temperature of said chamber walls further includes insulation of said main combustion chamber, said insulation of said main combustion chamber being located between said main combustion chamber and said piston, said cylinder walls, said cylinder head and said valves.

5. The thermal ignition combustion system of claim 4, wherein said insulation of said chamber walls includes at least one insulating barrier, said insulation of said chamber walls having an effective thermal conductivity less than 10 W/(m·K).

6. The thermal ignition combustion system of claim 5, wherein said at least one insulating barrier includes an air pocket having a thickness no less than 1.0 mm.

7. The thermal ignition combustion system of claim 6, wherein said at least one insulating barrier further includes a layer of zirconia located between said chamber walls and said air pocket, said layer of zirconia having a thickness no less than 1.0 mm.

8. The thermal ignition combustion system of claim 5, wherein said threshold temperature is approximately 700° F.

9. The thermal ignition combustion system of claim 8, wherein said fuel is a processed coal such as powdered coal wherein the average particle size of said coal is about 5 microns and wherein the particle size of greater than 90% of said coal is less than 20 microns.

10. The thermal ignition combustion system of claim 9, wherein said insulation of said main combustion chamber is zirconia.

11. The thermal ignition combustion system of claim 5, wherein said threshold temperature is approximately 1300° F.

12. The thermal ignition combustion system of claim 11, wherein said fuel is natural gas.

13. The thermal ignition combustion system of claim 12, wherein said insulation of said main combustion chamber is zirconia.

14. The thermal ignition combustion system of claim 5, further comprising a glow plug for aiding combustion until the temperature of said chamber walls reaches said threshold temperature.

15. A method of operating a thermal ignition combustion system in conjunction with an internal combustion engine using powdered coal as fuel, said engine having a main combustion chamber defined by a piston, a cylinder head, cylinder walls, a plurality of valves and an air intake and intake stroke of the piston, said thermal ignition combustion system comprising the steps of:
(a) providing ignition chamber walls defining an ignition chamber, said chamber walls being made of a material having a thermal conductivity greater than 20 W/m°C. and specific heat greater than 480 J/kg°C., said chamber walls being sufficiently insulated externally to said chamber walls and ignition chamber so as to be maintained above a threshold temperature of 700° F. during normal operation of said combustion system;
(b) fumigation of powdered coal into the air intake during the intake stroke of the piston in the cylinder; and
(c) providing a glow plug in said ignition chamber for igniting said fuel before said chamber walls reach a threshold operating temperature.

16. The thermal ignition combustion system of claim 15, wherein the material of said chamber walls has a heat capacity greater than 22 J/°C. per liter of displacement.

17. The method of claim 16, wherein said insulation of said chamber walls includes at least one insulating barrier, said insulation of said chamber walls having an effective thermal conductivity less than 10 W/(m·K).

18. The method of claim 17, wherein said at least one insulating barrier includes an air pocket having a thickness no less than 1.0 mm.

19. The method of claim 18, wherein said at least one insulating barrier further includes a layer of zirconia located between said chamber walls and said air pocket, said layer of zirconia having a thickness no less than 1.0 mm.

20. The method of claim 19, wherein said chamber walls are sufficiently insulated so as to be maintained at a temperature within the range of 1000° F. to 2000° F. during normal operation of said combustion system.

21. A method of operating a thermal ignition combustion system in conjunction with an internal combustion engine using natural gas as fuel, said engine having a main combustion chamber defined by a piston, a cylinder head, cylinder walls, a plurality of valves and an air intake and intake stroke of the piston, said thermal ignition combustion system comprising the steps of:
(a) providing ignition chamber walls defining an ignition chamber, said chamber walls being made of a material having a thermal conductivity greater than 20 W/m°C. and specific heat greater than 480 J/kg°C., said chamber walls being sufficiently insulated externally to said chamber walls and ignition chamber so as to be maintained above a threshold temperature of 1350° F. during normal operation of said combustion system;
(b) injection of high pressure natural gas into the ignition chamber during the intake stroke of the piston in the cylinder; and,
(c) providing a glow plug in said ignition chamber for igniting said fuel before said chamber walls reach a threshold operating temperature.

22. The thermal ignition combustion system of claim 21, wherein the material of said chamber walls has a heat capacity greater than 22 J/°C. per liter of displacement.

23. The method of claim 22, wherein said insulation of said chamber walls includes at least one insulating barrier, said insulation of said chamber walls having an effective thermal conductivity less than 10 W/(m·K).

24. The method of claim 23, wherein said at least one insulating barrier includes an air pocket having a thickness no less than 1.0 mm.

25. The method of claim 24, wherein said at least one insulating barrier further includes a layer of zirconia located between said chamber walls and said air pocket, said layer of zirconia having a thickness no less than 1.0 mm.

26. The method of claim 25, wherein said chamber walls are sufficiently insulated so as to be maintained at a temperature within the range of 1300° F. to 1800° F. during normal operation of said combustion system.

27. A thermal ignition combustion system adapted for use with an internal combustion engine having a main combustion chamber, comprising:
ignition chamber walls defining an ignition chamber in communication with the main combustion chamber, said chamber walls made of a material having a thermal conductivity greater than 20 W/m°C. and a specific heat greater than 480 J/kg°C., and
insulation means, substantially surrounding said chamber walls, for maintaining the temperature of said chamber walls above a threshold temperature capable of causing ignition of a fuel.

28. The thermal ignition combustion system of claim 27 wherein the heat capacity of said chamber walls is greater than 22 J/°C. per liter displacement.

29. The thermal ignition combustion system of claim 28 further including main combustion chamber insulation means, insulating the main combustion chamber, for aiding in maintaining the temperature of said chamber walls.

30. The thermal ignition combustion system of claim 27 wherein said threshold temperature is 700° F. and said fuel is a processed coal such as powdered coal.

31. The thermal ignition combustion system of claim 27 wherein said threshold temperature is 1300° F. and said fuel is natural gas.

* * * * *

UNITED STATES PATENT AND TRADEMARK OFFICE
CERTIFICATE OF CORRECTION

PATENT NO. : 4,738,227

DATED : April 19, 1988

INVENTOR(S) : Roy Kamo et al.

It is certified that error appears in the above-identified patent and that said Letters Patent is hereby corrected as shown below:

In column 2, line 18, please change "fule" to --fuel--.
In column 3, line 53, please change "syracuse" to --Syracuse--.
In column 5, line 31, please change "rates" to --ratios--.
In column 7, line 3, please change "siliconnitride" to --silicon nitride--.
In column 7, line 4, please change "(m·k)" to --(m·K)--.
In column 9, line 21, please change "aproximately" to --approximately--.

Signed and Sealed this

Eighth Day of November, 1988

Attest:

DONALD J. QUIGG

Attesting Officer

Commissioner of Patents and Trademarks